US010604234B2

(12) United States Patent
Foskey et al.

(10) Patent No.: US 10,604,234 B2
(45) Date of Patent: Mar. 31, 2020

(54) METHOD AND APPARATUS TO IMPROVE LIFT TO DRAG RATIO OF A ROTOR BLADE

(71) Applicant: Bell Helicopter Textron Inc., Fort Worth, TX (US)

(72) Inventors: Christopher E. Foskey, Keller, TX (US); Brendan P. Lanigan, Grapevine, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 139 days.

(21) Appl. No.: 15/843,039

(22) Filed: Dec. 15, 2017

(65) Prior Publication Data

US 2018/0362145 A1 Dec. 20, 2018

Related U.S. Application Data

(60) Provisional application No. 62/521,393, filed on Jun. 17, 2017.

(51) Int. Cl.
*B64C 11/18* (2006.01)
*B64C 11/24* (2006.01)
(Continued)

(52) U.S. Cl.
CPC .............. *B64C 11/18* (2013.01); *B64C 11/24* (2013.01); *B64C 27/473* (2013.01); *F03D 1/0683* (2013.01); *B64C 29/0033* (2013.01)

(58) Field of Classification Search
CPC ......... B64C 11/16; B64C 11/18; B64C 11/20; B64C 27/467; B64C 27/473; F03D 1/0641; F03D 1/0683
See application file for complete search history.

(56) References Cited

U.S. PATENT DOCUMENTS 4,976,587 A * 12/1990 Johnston ............... B64C 27/473
416/226
7,594,625 B2 * 9/2009 Robertson ............... B64C 11/16
244/70
(Continued)

FOREIGN PATENT DOCUMENTS

EP 2078852 A2 7/2009
EP 2341245 A2 7/2011
(Continued)

OTHER PUBLICATIONS

EP Exam Report, dated Oct. 25, 2018, by the EPO, re EP Patent App No. 18157738.8.
(Continued)

*Primary Examiner* — Kenneth J Hansen
*Assistant Examiner* — Jackson N Gillenwaters
(74) *Attorney, Agent, or Firm* — Timmer Law Group, PLLC

(57) ABSTRACT

In a first aspect, there is a method for improving a lift to drag ratio of a rotor blade, including providing a blade member having a leading edge and a trailing edge; providing a leading edge extension member; and coupling the leading edge extension member to a portion of the leading edge of the blade member to form the rotor blade. In a second aspect, there is a rotor blade including a blade member having a leading edge, and a trailing edge; and a leading edge extension member disposed on the leading edge of the blade member, wherein the leading edge extension member is configured to extend the chord length of at least a portion of the rotor blade. In a third aspect, there is a leading edge extension member for a rotor blade including a convex exterior surface configured to extend at least a portion of the chord length of the rotor blade.

13 Claims, 14 Drawing Sheets

(51) Int. Cl.
  *B64C 27/473* (2006.01)
  *F03D 1/06* (2006.01)
  *B64C 29/00* (2006.01)

(56) References Cited

U.S. PATENT DOCUMENTS

| | | | |
|---|---|---|---|
| 8,016,566 B2 | 9/2011 | Agnihotri et al. | |
| 8,303,250 B2 * | 11/2012 | Mohammed | F03D 7/0236 416/23 |
| 8,403,642 B2 * | 3/2013 | Carroll | F03D 1/0641 416/239 |
| 8,622,707 B2 * | 1/2014 | Mashue | F03D 1/0658 416/204 R |
| 9,056,674 B2 * | 6/2015 | White | B64C 27/18 |
| 9,120,564 B1 * | 9/2015 | White | B64C 27/473 |
| 2010/0215494 A1 * | 8/2010 | Bech | F03D 1/0675 416/31 |
| 2013/0209264 A1 | 8/2013 | Mashue et al. | |
| 2014/0271215 A1 * | 9/2014 | Measom | B23P 15/04 416/224 |
| 2014/0301856 A1 | 10/2014 | Oldroyd et al. | |

FOREIGN PATENT DOCUMENTS

| | | |
|---|---|---|
| EP | 3415422 A1 | 12/2018 |
| EP | 3415422 B1 | 7/2019 |
| ES | 2333929 A1 | 3/2010 |
| WO | 2004067380 A1 | 8/2004 |
| WO | 2007105174 A1 | 9/2007 |
| WO | 2012051717 A1 | 4/2012 |
| WO | 2016075619 A1 | 5/2016 |

OTHER PUBLICATIONS

European Search Report, dated Apr. 16, 2018, by the EPO, re EP Patent Application No. 18157738.8.
CA Office Action, dated Feb. 13, 2019, by the CIPO, re CA Patent App No. 2,995,889.
European Exam Report, dated May 8, 2018, by the EPO, re EP Application No. 18157738.8.
Communication under Rule 71(3) EPC—Intention to Grant, dated Apr. 17, 2019, by the EPO, re EP Patent App No. 18157738.8.
Decision to Grant, dated Jul. 4, 2019, by the EPO, re EP Patent App No. 18157738.8.
Defense News; Bell Helicopter 'within days' of first ground trials for V-280 Valor tilt-rotor; https://www.defensenews.com/land/2017/09/08/bell-helicopter-within-days-of-first-ground-runs-for-v-280-valor/; Sep. 7, 2017.
CA Office Action, dated Dec. 3, 2019, by the CIPO, re CA Patent App No. 2,995,889.

* cited by examiner ated, see FIG. 4A, cannot efficiently handle the wide range of operating conditions that the blade experiences due to early chordwise separation and subsequent rise in profile drag.

METHOD AND APPARATUS TO IMPROVE LIFT TO DRAG RATIO OF A ROTOR BLADE

CROSS-REFERENCE TO RELATED APPLICATION

This application claims priority to U.S. provisional patent application No. 62/521,393, filed Jun. 17, 2017, all of which is hereby incorporated by reference for all purposes as if fully set forth herein.

BACKGROUND

Technical Field

The present disclosure relates to aircrafts and, more particularly, to aircraft rotor blades.

Description of Related Art

The root portion of a rotor blade for a vertical take-off and landing (VTOL) aircraft experiences a wide range of aerodynamic conditions from hover (low relative velocity, high angle of attack) to cruise (high relative velocity, zero angle of attack). The conventional profile of the root portion of the rotor blade is typically thicker than the tip portion to accommodate hub attachment, bearings, and clearance through a large feathering motion range. The profile of the root portion of the rotor blade with a large thickness t to chord C ratio, see FIG. 4A, cannot efficiently handle the wide range of operating conditions that the blade experiences due to early chordwise separation and subsequent rise in profile drag.

In some VTOL aircraft, namely the V-22 Osprey, there is a removable fairing positioned over the blade grip to improve the aerodynamics of the aircraft during operation. However, the removable fairing is associated with movable portions or is removed to not interfere with the folding of the rotor blades during stowage of the aircraft. Additionally, a removable fairing on or associated with a rotor blade is undesirable as the removable fairing can add weight to the blade and decrease efficiency during operation of the aircraft.

There is a need to improve the aerodynamic efficiency and performance of a rotor blade for a VTOL aircraft.

SUMMARY

In a first aspect, there is provided a method for improving a lift to drag ratio of a rotor blade, including providing a blade member having a leading edge and a trailing edge; providing a leading edge extension member; and coupling the leading edge extension member to a portion of the leading edge of the blade member to form the rotor blade.

In an embodiment, the blade member includes a root portion and a tip portion, the leading edge extension member is disposed on the root portion.

In one embodiment, the lift to drag ratio of the root portion of the rotor blade is determined by selectively tailoring at least one of a chord length, a thickness, and a shape of the leading edge extension member.

In still another embodiment, the leading edge extension member includes an inner surface that defines a hollow interior portion for receiving the blade member.

In yet another embodiment, the step of coupling includes coupling the blade member to at least a portion of the inner surface of the leading edge extension member.

In an exemplary embodiment, the blade member has an airfoil geometry including at least one of the following: a NACA geometry, a modified NACA geometry, and combinations thereof.

In an another embodiment, the leading edge extension member has a root end, and the steps further include coupling an end closeout to the root end of the leading edge extension member.

In still another embodiment, the method further includes locating the leading edge extension member on the blade member using a groove in the leading edge extension member.

In a second aspect, there is provided a rotor blade including a blade member having a leading edge, and a trailing edge; and a leading edge extension member disposed on the leading edge of the blade member, wherein the leading edge extension member is configured to extend the chord length of at least a portion of the rotor blade.

In another embodiment, the blade member includes a root portion and a tip portion, the leading edge extension member is disposed on the root portion of the blade member.

In yet another embodiment, the chord length of the root portion of the blade member is more than the tip portion of the blade member.

In still another embodiment, wherein the blade member has an airfoil geometry including at least one of the following: a NACA geometry, a modified NACA geometry, and combinations thereof.

In an embodiment, the leading edge extension member includes a top side; a bottom side; and a curved portion disposed between the top side and bottom side; wherein the top side, bottom side, and the curved portion form a convex outer surface configured to extend at least a portion of the chord length of the rotor blade.

In another embodiment, the ramped portion has an inclined angle greater than an inclined angle of the upper portion.

In another embodiment, the leading edge extension member further includes a groove disposed on at least one of the top side and the bottom side configured for locating the leading edge extension member on the blade member.

In an embodiment, the leading edge extension member further includes an inner surface that defines a hollow interior portion for receiving the blade member.

In still another embodiment, the rotor blade further includes an end closeout disposed on a root end of the leading edge extension member.

In a third aspect, there is provided a leading edge extension member for a rotor blade including a convex exterior surface configured to extend at least a portion of the chord length of the rotor blade.

In an embodiment, the convex exterior surface includes a ramped portion and an upper portion.

In some embodiments, the ramped portion has an inclined angle greater than an inclined angle of the upper portion.

In another embodiment, the convex exterior surface includes a top side, a bottom side, and a curved portion disposed between the top side and the bottom side.

In one embodiment, the leading edge extension member further includes a groove disposed on at least one of the top side and the bottom side.

In yet another embodiment, the leading edge extension member further includes a hollow interior portion configured to receive a blade member.

In a fourth aspect, there is provided a method for designing a rotor blade for generating improved lift and reduced drag as compared to a conventional rotor blade including increasing the chord length of the root portion of the rotor blade by disposing a leading edge extension member on the leading edge of a blade member.

In a fifth aspect, there is provided a method for increasing the chord length C2 in a root portion of a rotor blade by coupling a leading edge extension member having a hollow interior portion to a leading edge of a blade member.

In a sixth aspect, there is provided a method of improving the lift to drag ratio of a rotor blade including providing a blade member having a root portion, a tip portion, a leading edge, and a trailing edge; providing a leading edge extension member having a hollow interior portion for receiving the blade member; selectively tailoring the leading edge extension member to determine the lift to drag ratio of a rotor blade; coupling the leading edge extension member to the root portion of the blade member to form the rotor blade.

In a seventh aspect, there is provided a method of manufacturing including contacting plies to a mold selectively configured to achieve the desired shape of the leading edge extension member; compacting the plies to form a pre-cured leading edge extension member; providing a blade member having a top surface and a bottom surface; providing a pre-cured leading edge extension member having an upper and lower inner surface defining a hollow interior portion for receiving the blade member; adhesively coupling the upper and lower inner surfaces of the leading edge extension member to the top and bottom surfaces of the blade member; coupling an end closeout to the root end of the leading edge extension member; and curing at least one of the leading edge extension member, the end closeout, and the blade member.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the apparatuses and methods to improve lift to drag ratio of a rotor blade are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the devices, members, apparatuses, etc. described herein may be oriented in any desired direction.

Figure 1:
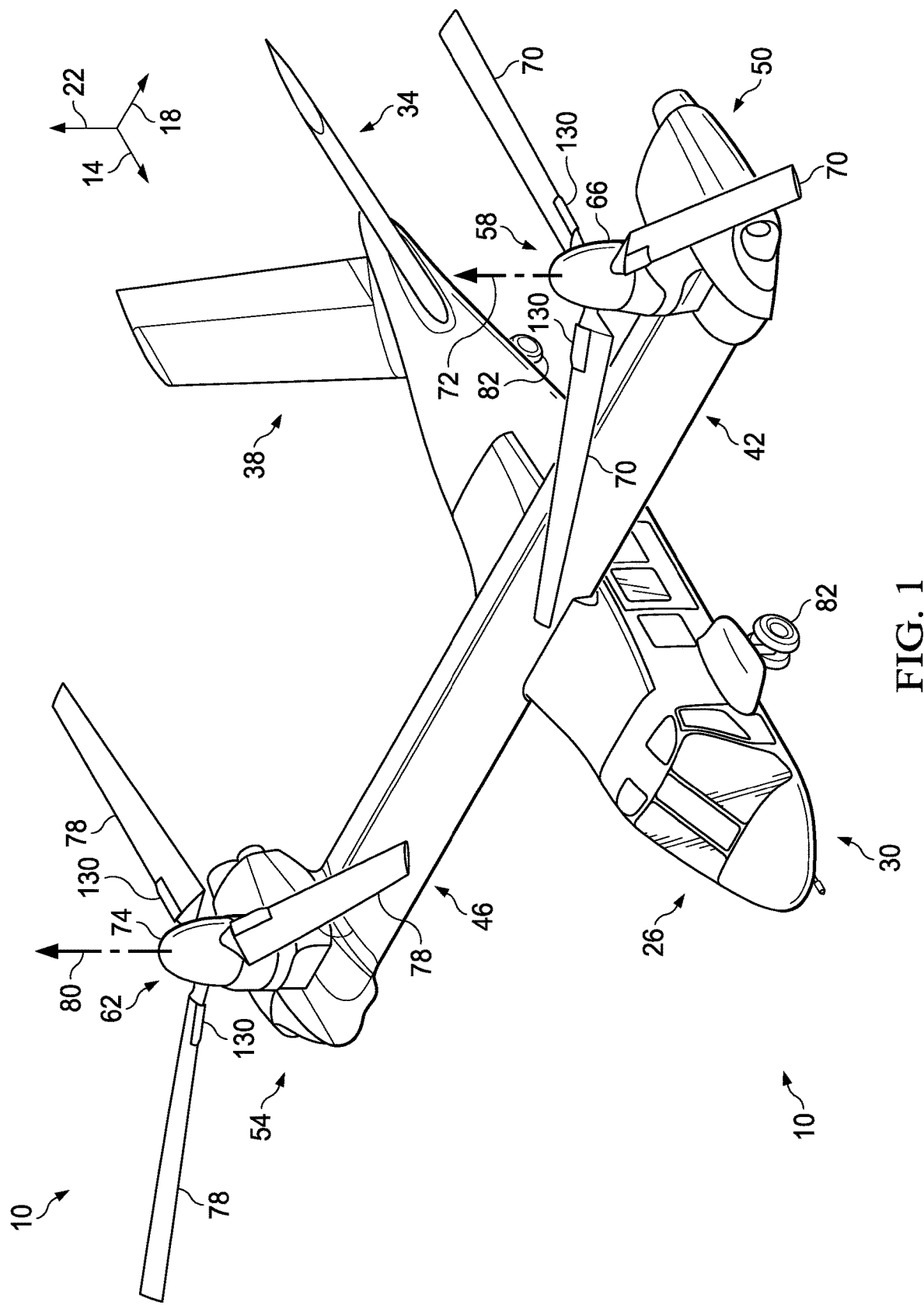
FIG. 1 is a perspective view of an aircraft, according to one example embodiment.
Figure 2:
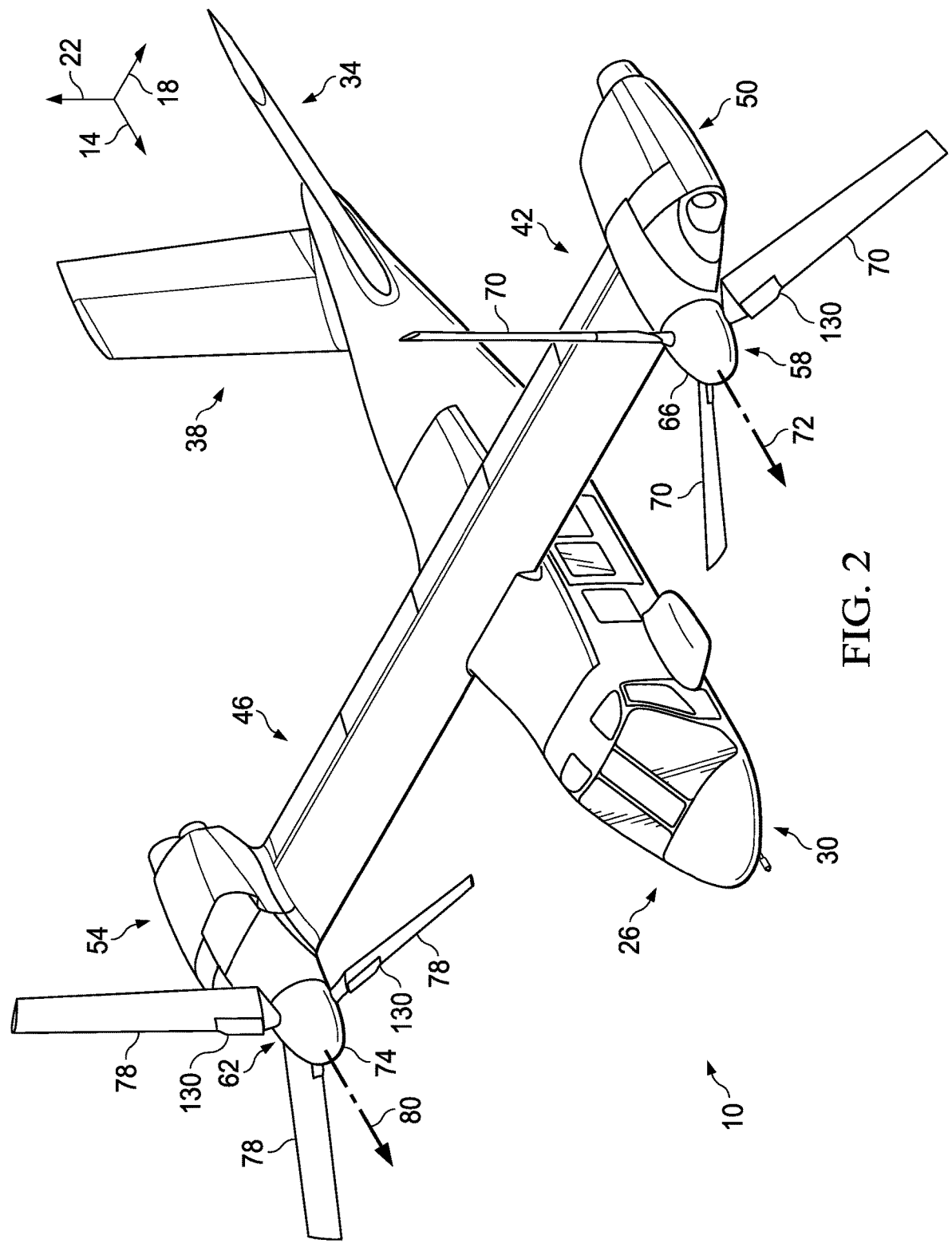
FIG. 2 is another perspective view of an aircraft, according to one example embodiment.
Figure 3:
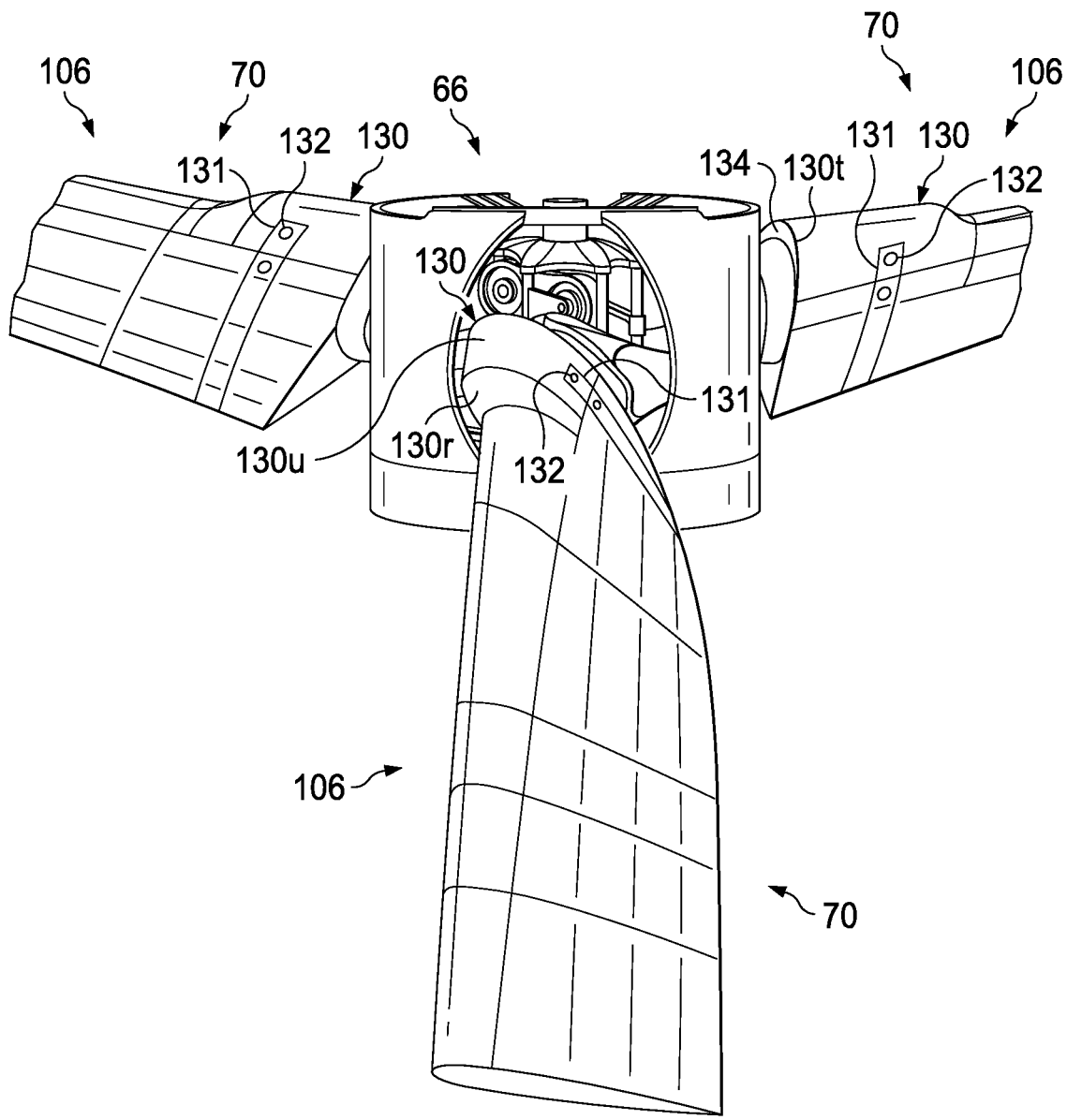
FIG. 3 is a side view of a rotor assembly, according to one example embodiment.

FIGS. 1-2 depict aircraft 10 as a tiltrotor aircraft. FIGS. 1-2 depict three mutually orthogonal directions X, Y, and Z forming a three-dimensional frame of reference XYZ. Longitudinal axis X 14 corresponds to the roll axis that extends through the center of aircraft 10 in the fore and after directions. Transverse axis Y 18 is perpendicular to longitudinal axis 14 and corresponds to the pitch axis (also known as a control pitch axis or "CPA"). The X-Y plane is considered to be "horizontal." Vertical axis Z 22 is the yaw axis and is oriented perpendicularly with respect to the X-Y plane. The X-Z plane and Y-Z plane are considered to be "vertical."

Aircraft 10 includes fuselage 26 as a central main body. Fuselage 26 extends parallel to longitudinal axis 14 from a fuselage front end 30 to a fuselage rear end 34. Aircraft 10 further includes tail member 38 extending from fuselage rear end 34 of fuselage 26. Aircraft 10 includes wing 42 and wing 46 extending from fuselage 26 substantially parallel to transverse axis Y 18. Wing 42 is coupled to propulsion system 50, and wing 46 is coupled to propulsion system 54. Propulsion system 50 includes rotor assembly 58, and propulsion system 54 includes rotor assembly 62. Rotor assembly 58 includes rotor hub 66 and plurality of rotor blades 70 extending from rotor hub 66 and configured to rotate about axis 72. Similarly, rotor assembly 62 includes rotor hub 74 and plurality of rotor blades 78 extending from rotor hub 74 and configured to rotate about axis 80. Each of rotor assemblies 58 and 62 can, for example, be coupled to and controlled with an engine and gearbox connected to a driveshaft, such as one continuous driveshaft extending from propulsion system 50 to propulsion system 54 or a segmented driveshaft separated by a gearbox.

Rotor assemblies 58 and 62 are controllable and positionable to, for example, enable control of direction, thrust, and lift of aircraft 10. For example, FIG. 1 illustrates aircraft 10 in a first configuration, in which propulsion systems 50 and 54 are positioned to provide a lifting thrust to aircraft 10, if activated. In the embodiment shown in FIG. 1, propulsion systems 50 and 54 are positioned such that, if activated, aircraft 10 moves substantially in the Z direction ("helicopter mode"). In the embodiment shown in FIG. 1, aircraft 10 further includes landing gear 82 with which aircraft 10 can contact a landing surface.

FIG. 2 illustrates aircraft 10 in a second configuration, in which propulsion systems 50 and 54 are positioned to provide a forward thrust to aircraft 10, if activated. In the embodiment shown in FIG. 2, propulsion systems 50 and 54 are positioned such that, if activated, aircraft 10 moves substantially in the X direction ("airplane mode"). In the second configuration depicted in FIG. 2, wings 42 and 46 enable a lifting thrust to be provided to aircraft 10. Though not depicted in FIGS. 1-2, propulsion systems 50 and 54 can be controllably positioned in helicopter mode, airplane mode, or any position between helicopter mode and airplane mode to provide for a desired direction, thrust, and/or lift.

FIGS. 3-14 relate to methods and apparatuses for improving the aerodynamic performance of a rotor blade for a VTOL aircraft. Any method, apparatus, or associated rotor blade components depicted in FIGS. 3-14 and/or described herein can be used in combination with aircraft 10 depicted in FIGS. 1-2 to operate as described. Additionally, the methods, apparatuses, and associated rotor blade components described herein can be used with any aircraft configured or configurable to include one or more rotor assemblies, including helicopters, tilt wing aircrafts, unmanned aerial vehicles (UAVs), and other vertical lift aircrafts, or can further be used with any device configured or configurable to include a rotor blade, including devices with propellers, windmills, and wind turbines.

The methods, apparatuses, and associated rotor blade components described herein involve improving the lift to drag ratio of a rotor blade 106 for the plurality of rotor blades 70, 78. In an embodiment, method 100 improves the performance of a VTOL aircraft by improving a lift to drag ratio of a rotor blade. In an embodiment, referring to FIG. 4B, the method 100 includes a step 102 of providing a blade member 108 having a root portion 110, a tip portion 112, a leading edge 114, and a trailing edge 116. The method 100 can include the following: a step 104 such that a leading edge extension member 130 is provided, and, in step 107, the leading edge extension member 130 is coupled to a portion of the leading edge 114 of the blade member 108 to form the rotor blade 106.

In an embodiment, the blade member 108 can have an airfoil geometry including at least one of the following: a National Advisory Committee for Aeronautics (NACA) geometry, a modified NACA geometry, and combinations thereof. The NACA geometry can be identified using the conventional 4-digit definitions. The modified NACA geometry can be variations of the NACA geometry. The modified NACA geometry can include three dimensional surfaces of the blade member 108 comprised of various two dimensional sections across the span of the blade member 108. In some embodiments, the blade member 108 can include at a portion having a NACA geometry and a portion having a modified NACA geometry. Those skilled in the art will appreciate that any suitable cross-sectional airfoil profile can be used, whether a NACA geometry or a modified NACA geometry, without departing from the spirit and scope of the disclosure.

Rotor blade 106 is shown in FIGS. 3, 6-8, and 11. Rotor blade 106 includes a root portion 140, a root end 140$t$, a tip portion 142, a tip end 142$t$, a leading edge 144, a trailing edge 146, a top surface 148, and a bottom surface 149. In an embodiment, root portion 140 is disposed adjacent to root end 140$t$. In an embodiment, root portion 140 is a portion inboard of the tip portion 142. In an embodiment, root portion 140 is a portion that is about ½ or less the spanwise length of the rotor blade 106. In some embodiments, root portion 140 is a first inboard portion that extends in the first ½, ⅓, ¼ or ⅕ of the length of the rotor blade 106. In an embodiment, the spanwise length of the rotor blade 106 is from root end 140$t$ to 142$t$. In an embodiment, the leading edge extension member 130 extends partially along the spanwise length of the rotor blade 106. Rotor blade 106 may be required to twist about a pitch change axis S, which can broadly be a spanwise axis. The pitch change axis S can define a leading edge portion 144$p$ and a trailing edge portion 146$p$ of the rotor blade 106.

In an embodiment, rotor blade 106 includes leading edge extension member 130 disposed on at least a portion of the leading edge 114 of the blade member 108. In some embodiments, the leading edge extension member 130 is disposed on the root portion 140 of the rotor blade 106. In a preferred embodiment, leading edge extension member 130 is disposed in the leading edge portion 144$p$ of the rotor blade 106.

Figure 4A:
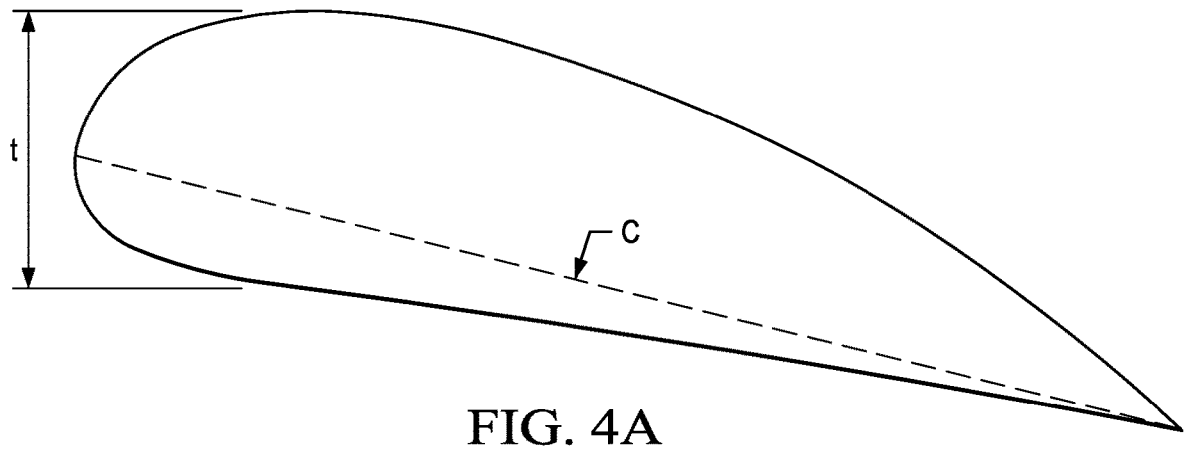
FIG. 4A is a schematic of a rotor blade to illustrate the thickness t to chord C ratio.
Figure 4B:
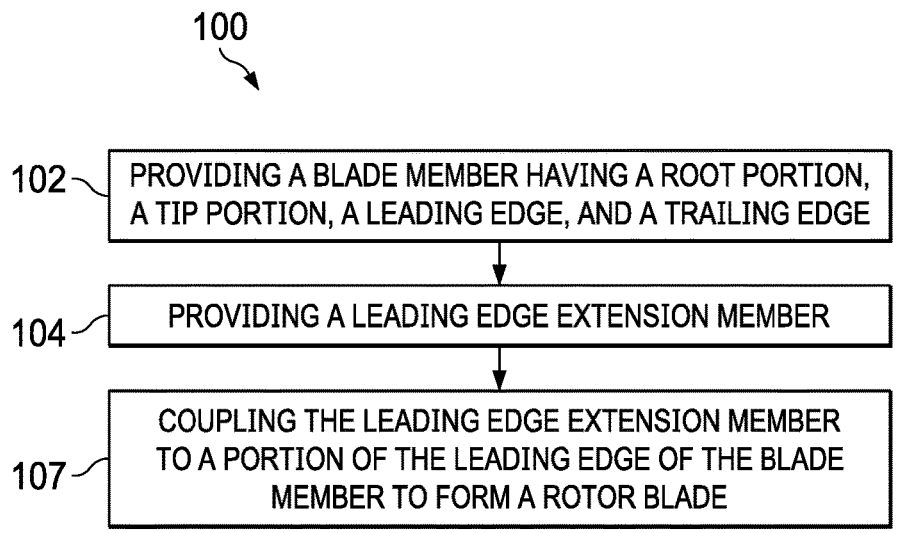
FIGS. 4B-4C are flowcharts illustrating methods of improving the lift to drag ratio for a rotor blade, according to illustrative embodiments.
Figure 4C:
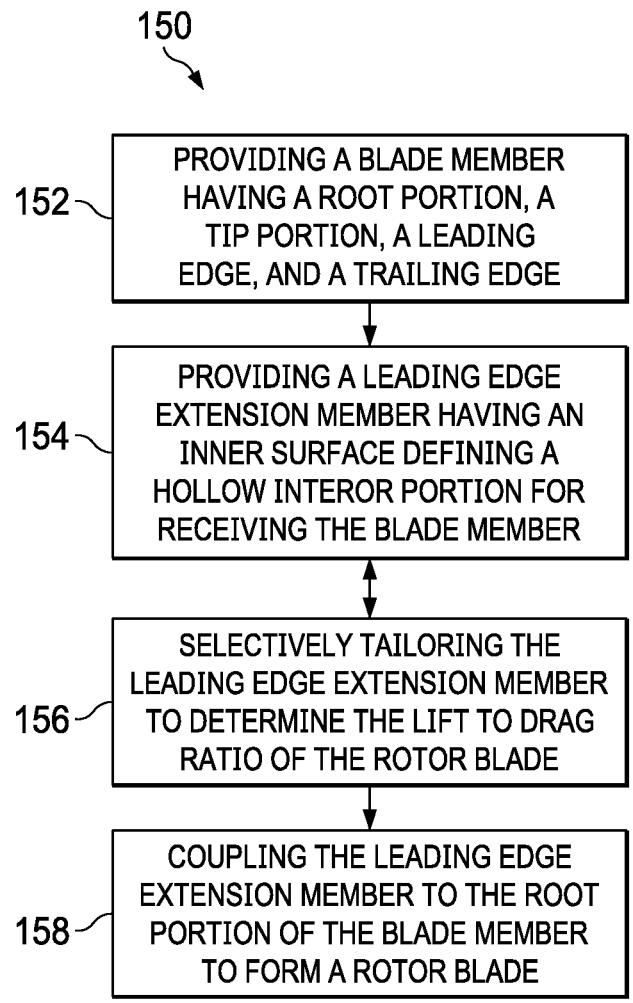

In a method 150, shown in FIG. 4C, there can be a method for improving the lift to drag ratio of a rotor blade 106, including a step 152 of providing a blade member 108 having a root portion 110, a tip portion 112, a leading edge 114, and a trailing edge 116; a step 154 of providing a leading edge extension member 130 having an inner surface 130$i$ defining a hollow interior portion 130$h$ for receiving the blade member 108; a step 156 of selectively tailoring the leading edge extension member 130 to reduce the drag of the rotor blade 106; and a step 158 of coupling the root portion 110 of the blade member 108 to the inner surface 130$i$ of the leading edge extension member 130 to form the rotor blade 106.

Figure 10:
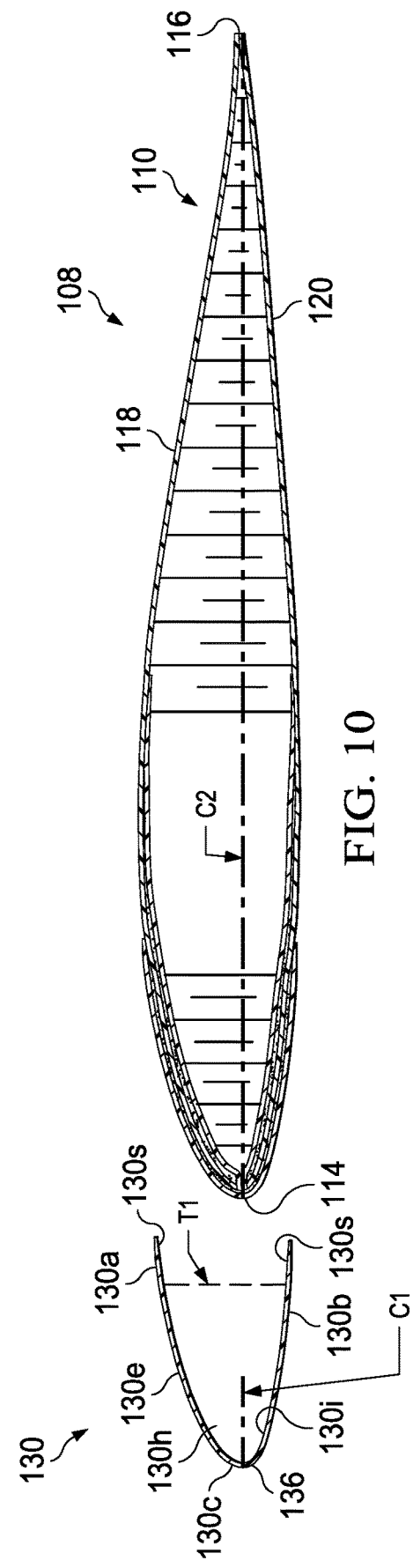
FIG. 10 is a cross-sectional view of a leading edge extension member and a blade member, according to an illustrative embodiment.
Figure 11:
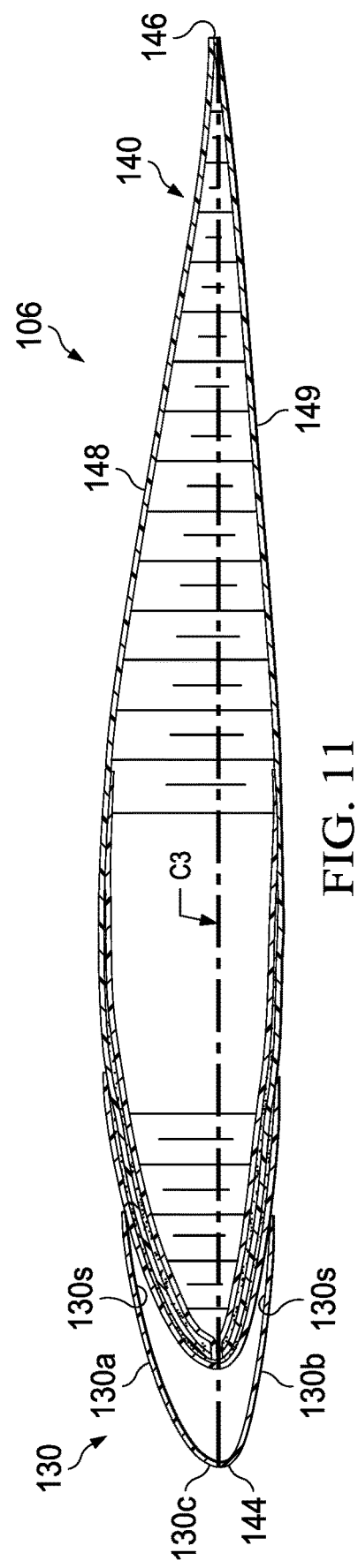
FIG. 11 is a cross-sectional view of a rotor blade, according to an illustrative embodiment.

The lift to drag ratio of the root portion 140 of the rotor blade 106 and/or the entire rotor blade 106 can be determined by selectively tailoring at least one of the chord length C1, thickness T1, and shape of the leading edge extension member 130. In an embodiment, the chord length C3 of the root portion 140 of the rotor blade 106 is selectively tailored by the leading edge extension member 130 as shown in FIGS. 10-11.

Figure 4E:
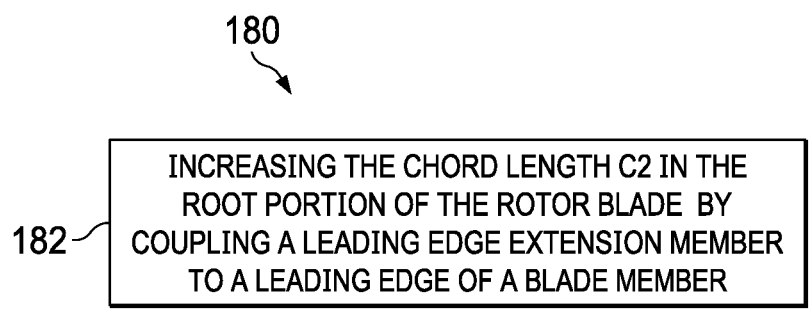
FIG. 4E is a flowchart illustrating a method for designing a cross-section of a root portion of a rotor blade to improve the lift to drag ratio, according to illustrative embodiments.

In an embodiment illustrated in FIG. 4E, there is a method 180 for designing a cross-section of a rotor blade 106 to improve the lift to drag ratio thereof including the step 182 of increasing the chord length C3 in the root portion 140 of the rotor blade 106 by coupling a leading edge extension member 130 to a leading edge 114 of a blade member 108.

Figure 5:
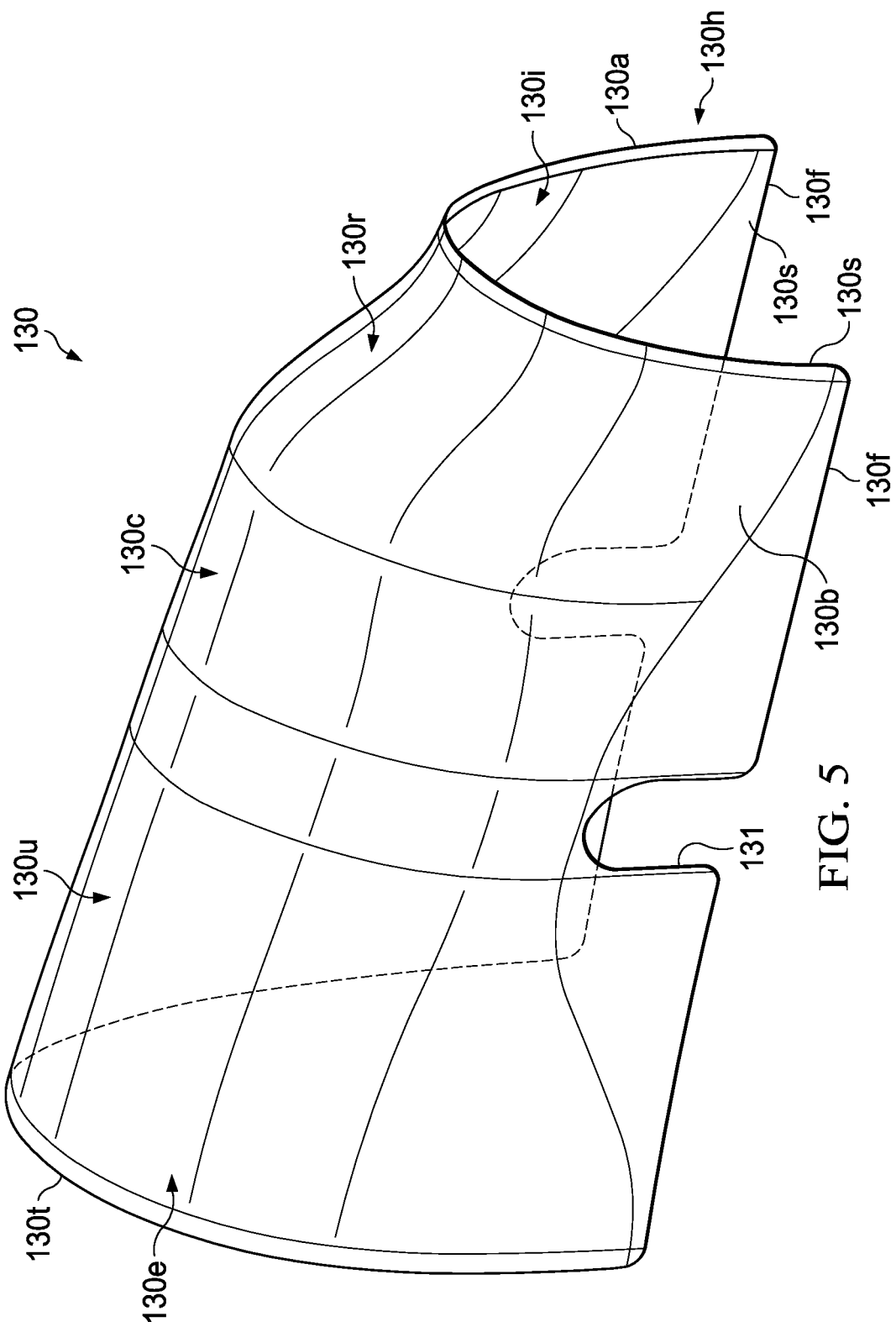
FIG. 5 is a perspective view of a leading edge extension member, according to an exemplary embodiment.
Figure 6:
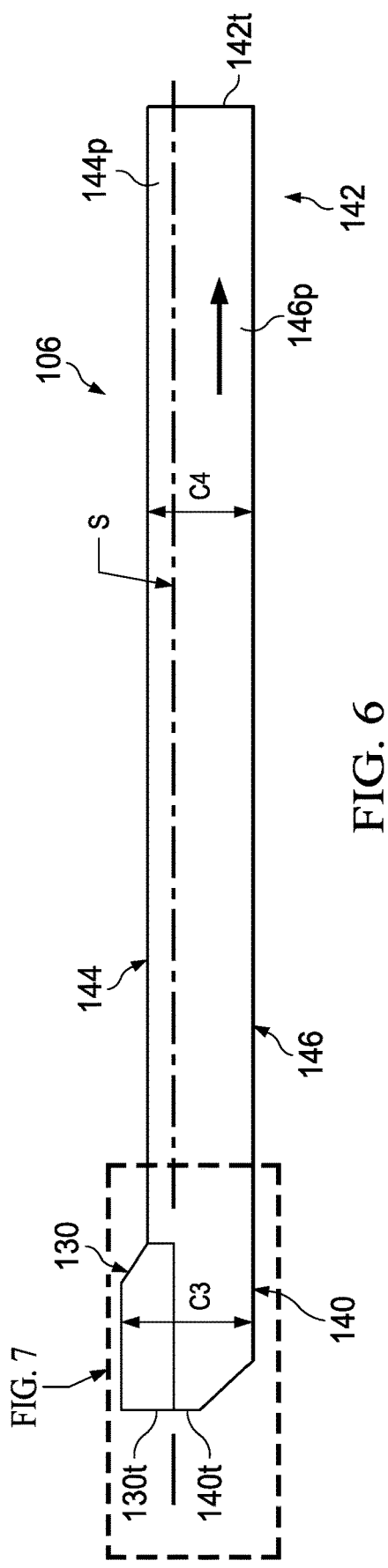
FIG. 6 is a top view of a rotor blade, according to one example embodiment.

Referring to the embodiment shown in FIG. 5, the leading edge extension member 130 can include top and bottom sides 130a, 130b and a curved portion 130c that form a convex outer surface 130e. In an embodiment, the convex outer surface 130e can have an C-shaped profile. The top and bottom sides 130a, 130b can be generally straight and configured to be disposed on the blade member 108 when assembled as rotor blade 106. The curved portion 130c can generally mimic the curvature of the leading edge 114 of the blade member 108. The curved portion 130c can be an inwardly curved to provide the desired aerodynamic properties for the rotor blade 106.

Figure 7:
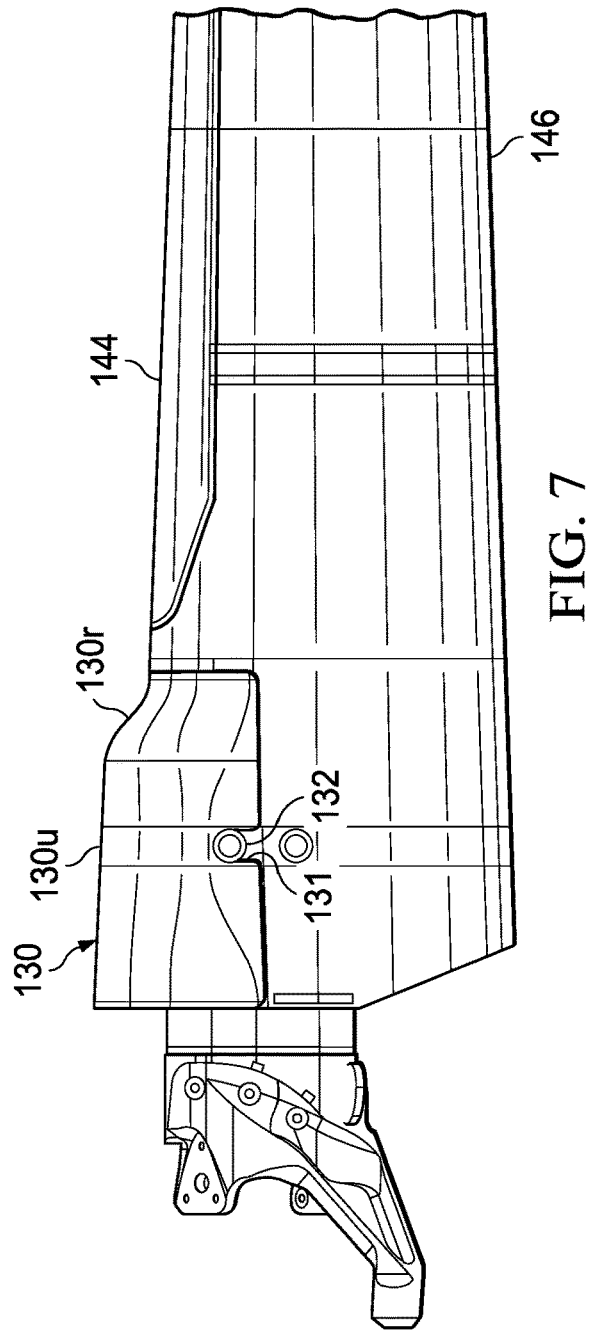
FIG. 7 is a partially removed detail view of the rotor blade in FIG. 6 including the grip and pitch horn, according to an illustrative embodiment.
Figure 8:
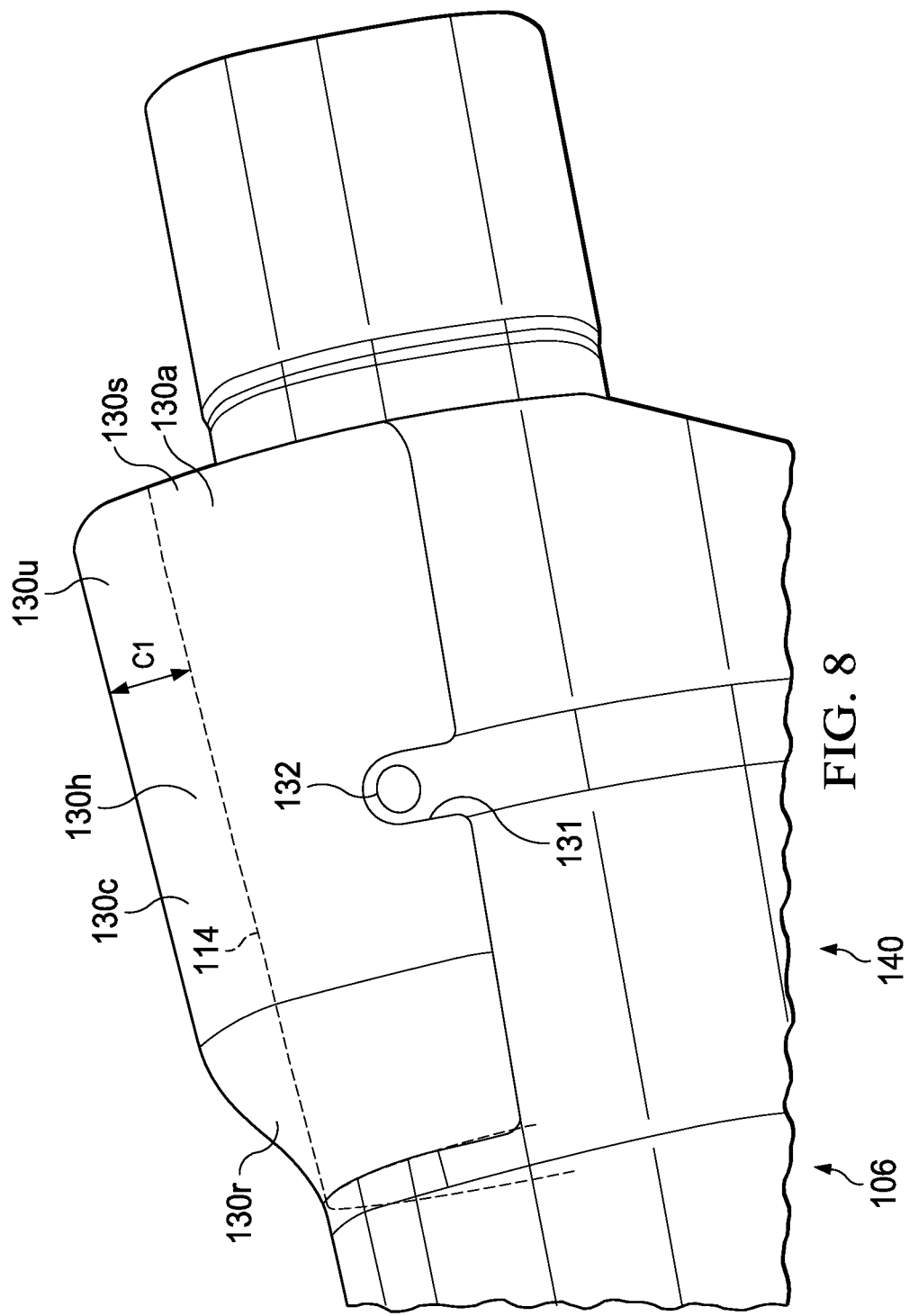
FIG. 8 is a perspective view of a root portion of a rotor blade, according to an exemplary embodiment.
Figure 9:
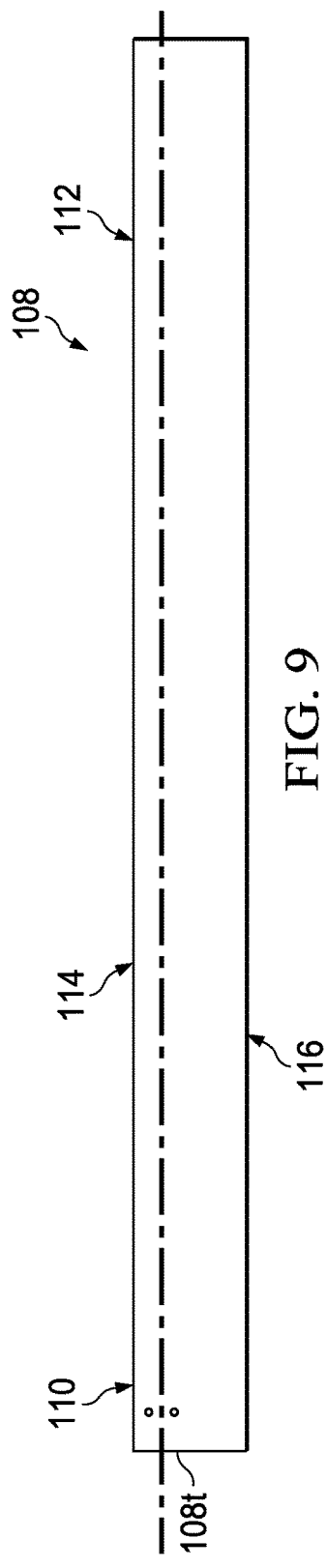
FIG. 9 is a top view of a blade member, according to an example embodiment.

The convex outer surface 130e can include an upper portion 130u and a ramped portion 130r as shown in FIGS. 5 and 7. The upper portion 130u can be disposed adjacent to a root end 130t of the leading edge extension member 130. The upper portion 130u can form an inclined angle relative to the leading edge 114. The ramped portion 130r can be outward from and adjacent to the upper portion 130u. The ramped portion 130r can ramped (e.g., at an inclined angle) to meet the leading edge 114 of the blade member 108. The ramped portion 130r can form an inclined angle relative to the leading edge 114. In a preferred embodiment, the ramped portion 130r forms an inclined angle greater than the inclined angel of the upper portion 130u. It should be appreciated that the convex outer surface 130e may take on a wide variety of configurations. For example, there may be additional angled portions or other aerodynamically desirable features.

In an embodiment, at least one of the top and bottom sides 130a, 130b includes groove 131. In some embodiments, groove 131 can be configured for locating the leading edge extension member 130 on the blade member 108. In a preferred embodiment, a groove 131 is disposed on each of the top and bottom sides 130a, 130b at the aft edges 130f of the leading edge extension member. It should be noted that the configuration of groove 131 is merely an example and that other groove shapes (e.g., slots) and geometries exist. It should be noted that in some embodiments, groove 131 is not required for locating the leading edge extension member 130 onto blade member 108.

In some embodiments, the leading edge extension member 130 includes the inner surface 130i that defines the hollow interior portion 130h. The inner surface 130i can be a concave inner surface. The inner surface 130i can include side surfaces 130s of the top and bottom sides 130a, 130b. The wall thickness of the leading edge extension member 130, as well as the geometry thereof, can be selectively tailored to produce the desired profile for the hollow interior portion 130h. For example, a leading edge extension member 130 having a greater thickness than shown in FIG. 5 would result in a smaller hollow interior portion 130h. The hollow interior portion 130h can be configured to receive the leading edge 114 of the blade member 108. In the illustrated embodiment, the hollow interior portion 130h is generally a horseshoe shape that mimics the convex outer surface 130e; however, it should be appreciated that other embodiments may have other shapes suitable for receiving the blade member 108 therein.

Figure 4D:
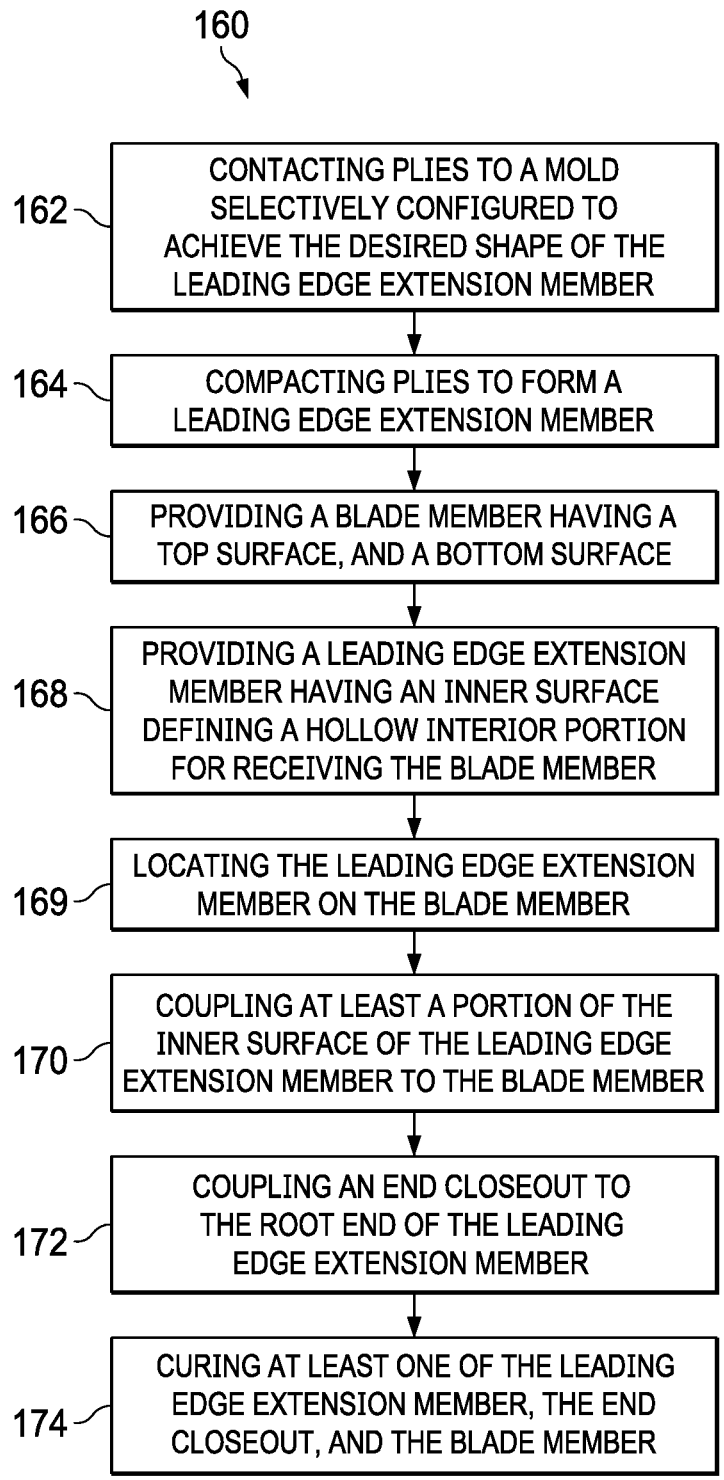
FIG. 4D is a flowchart illustrating methods of making a rotor blade having an improved lift to drag ratio, according to an illustrative embodiment.

Referring to FIG. 4D, there is a method 160 of making a rotor blade 106 having an improved lift to drag ratio, can include at least one of the following steps: a step 162 of contacting plies to a mold selectively configured to achieve the desired shape of the leading edge extension member 130, a step 164 of compacting the plies to form a leading edge extension member; a step 166 of providing a blade member 108 having a top surface 118, and a bottom surface 120; a step 168 of providing a leading edge extension member 130 having an inner surface 130i defining a hollow interior portion 130h for receiving the blade member 108; a step 169 of locating the leading edge extension member 130 on the blade member; a step 170 of coupling at least a portion of the inner surface 130i of the leading edge extension member 130 to the blade member 108; a step 172 of coupling an end closeout 134 to the root end 130t of the leading edge extension member 130; and a step 174 of curing at least one of the leading edge extension member 130, the end closeout 134, and the blade member 108.

The plies in steps 162 and 164 can be comprised of a composite material including plies of at least one of a fabric and a tape. In one embodiment, the plies are pre-impregnated with an un-cured resin. The resin can be applied to a conventional paper liner and transferred to the ply or applied directly to the ply and then heated to melt and infuse the resin therein. Prior to layup in or on a mold, a portion of the conventional liner can be removed, and a detection liner can be applied to one or more of the sides of a resin impregnated ply, which can assist manufacturing techniques. The plies can be made from a fiber that is composed of continuous filaments or fibers including one or more of glass, carbon, graphite, basalt, an aromatic polyamide (i.e. "aramid") material, a variant of an aromatic polyamide material (e.g., a polyparaphenylene terephthalamide material, such as Kevlar® by E.I. du Pont de Nemours and Company of Richmond, Va.), or the like. However, the continuous filaments or fibers described herein can include any suitable material or combination of materials. The resin can be a polymeric matrix or any suitable resin system, such as a thermoplastic or thermosetting resin. Other exemplary resins can include epoxy, polyimide, polyamide, bismaleimide, polyester, vinyl ester, phenolic, polyetheretherketone (PEEK), polyetherketone (PEK), polyphenylene sulfide (PPS), and the like. In an embodiment, the fabric is a woven fabric. In another embodiment, the tape is a unidirectional tape.

In an embodiment, the plies can be an intermediate modulus epoxy resin impregnated carbon fiber fabric. The intermediate modulus epoxy impregnated carbon fiber fabric can be stiffer than conventional composite fabrics which allows for fewer plies, which reduces the weight and manufacturing cost, while the epoxy resin system can provide tolerance to damage.

The step 162 of contacting plies to a mold can include placing the plies in a mold and/or on a mold. It should be appreciated that even though leading edge extension member 130 is described with resin impregnated plies, other composite manufacturing process may be used. For example, a resin transfer molding process can be used, which involves fabric layers, without being impregnated with resin, being placed in a selected pattern within a mold to achieve the desired shape of the leading edge extension member 130. Further, resin can be transferred into a mold such that the fibers and resin are combined, and then cured to form leading edge extension member 130.

The step 164 of compacting the plies can include applying a vacuum to the plies in or on a mold or by pressing a second mold member on the plies disposed in a mold cavity.

The step 169 of locating the leading edge extension member 130 onto the blade member 108 can include locating using groove 131 in the leading edge extension member 130. In a particular embodiment, the locating step 169 can include identifying a bolt 132 in the blade member 108 and positioning the groove 131 therearound to align the leading edge extension member 130 on the blade member 108. In a preferred embodiment, the top and bottom sides 130a, 130b each include a groove 131 that is positioned around a bolt 132 on the top and bottom surfaces 118, 120 of the blade member 108.

The step 170 of coupling at least a portion of the inner surface 130i of the leading edge extension member 130 to the blade member 108 can include coupling the side surfaces 130s of the top and bottom sides 130a, 130b to the top and bottom surfaces 118, 120 of the blade member 108, respectively. As used herein, the term "coupled" may include direct or indirect coupling by a conventional fastener or connector, including non-moving mechanical connections (e.g., adhesively connecting and/or co-curing the blade member 108, an end closeout 134, and the leading edge extension member 130). In an embodiment, the side surfaces 130s of the top and bottom sides 130a, 130b are adhesively coupled to the top and bottom surfaces 118, 120, respectively, of the blade member 108. The top and bottom sides 130a, 130b can be coupled to the top and bottom surfaces 118, 120 of the blade member 108 using a conventional fastener (e.g., screw, nut, bolt, etc.) in holes in the leading edge extension member 130 and the blade member 108.

In an embodiment, the method 160 includes a step 172 of coupling an end closeout 134 to the root end 106r of the rotor blade. In an embodiment, the end closeout 134 is coupled to the root end 130t of the leading edge extension member 130 and the root end 108t of the blade member 108. In some embodiments, the root end 130t is a hollow root end for receiving the end closeout 134. There can also be a step 174 including curing at least one of the leading edge extension member 130, the end closeout 134, and blade member 108.

An embodiment provides modifying a chord length of a rotor blade 106 using a leading edge extension member 130 to selectively tailor the thickness t to chord C ratio t/C, as shown in FIG. 4A. Chord C can be a chord length that is defined as the distance between the farthest point on the trailing edge and the point on the leading edge where the chord length intersects the leading edge. In an embodiment, the chord length C3 of the rotor blade 106 is longer than the chord length C2 of the blade member 108, as shown in FIGS. 11 and 10, respectively. In an embodiment, the chord length C1 of the leading edge extension member is selectively tailored to determine the chord length C3 of the rotor blade 106. In an embodiment, the chord length C1 of the leading edge extension member is about 1/20, 1/18, 1/16, 1/14, 1/12, 1/10, 1/8, 1/6, 1/4, or 1/2 the chord length C2 of the blade member 108. The chord length C1 is defined as a length from the point of leading edge 114 of the blade member 108 at the chord length C2 to the leading edge 136 of the leading edge extension member 130. It should be appreciated that the chord length C1 of the leading edge extension member 130 may take on a wide variety of configurations. For example, the chord length C1 may be longer in the upper portion 130u than the chord length C1 in the ramped portion 130r. In an exemplary embodiment, the chord length C3 in a root portion 140 is more than (e.g., longer) than the chord length C4 in the tip portion 142 of the rotor blade 106.

In another embodiment, the thickness T1 of the leading edge extension member 130 can be selectively tailored to adjust the lift to drag ration in a portion of the rotor blade. For example, the thickness T1 of the leading edge extension member 130 can be more (e.g. thicker from the top and bottom sides 130a, 130b) than the thickness of the top and bottom surfaces 118, 120 of the blade member. In an exemplary embodiment, the leading edge portion 144p with the leading edge extension member 130 is thicker than the trailing edge portion 146p of the rotor blade 106. It should be appreciated that the thickness T1 of the leading edge extension member 130 may take on a wide variety of configurations. For example, the thickness T1 may be thicker in the upper portion 130u than the thickness T1 in the ramped portion 130r.

Figure 12:
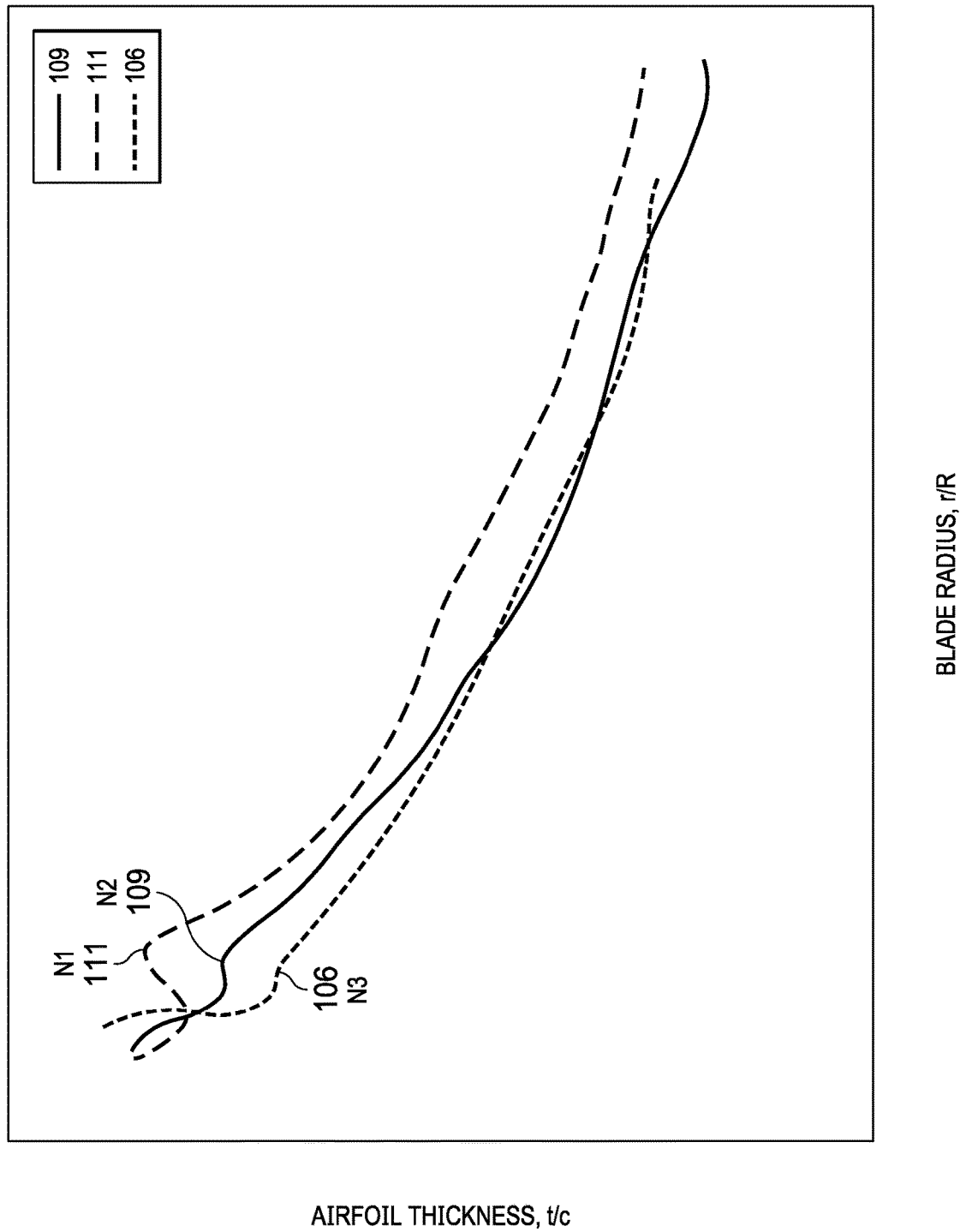
FIG. 12 shows an exemplary graph illustrating trends of airfoil thickness and blade radius of a rotor blade 106, a rotor blade 109, and a rotor blade for a conventional tiltrotor aircraft 111, according to an illustrative embodiment.

In an embodiment, method 100 of reducing the thickness t to chord C ratio t/C can improve the lift to drag ratio of the root portion 140 of the rotor blade 106, and thereby improves the lift to drag ratio of the rotor blade 106 during operation. FIG. 12 illustrates trends of airfoil thickness to chord ratio t/C versus the blade radius r/R for a rotor blade 106, a rotor blade 109 (e.g., final assembled rotor blade having the same configuration as blade member 108), and a V-22 Osprey rotor blade 111. An undesirable notch N1 is identified with the rotor blade 111 in an inboard portion of the blade, while the rotor blade 109 also includes an undesirable notch N2. Rotor blade 106 profile has a less pronounced notch N3 as compared notches N1 and N2, which correlates to improved aerodynamic performance of the rotor blade 106 as compared to rotor blades 109, 111.

Figure 13:
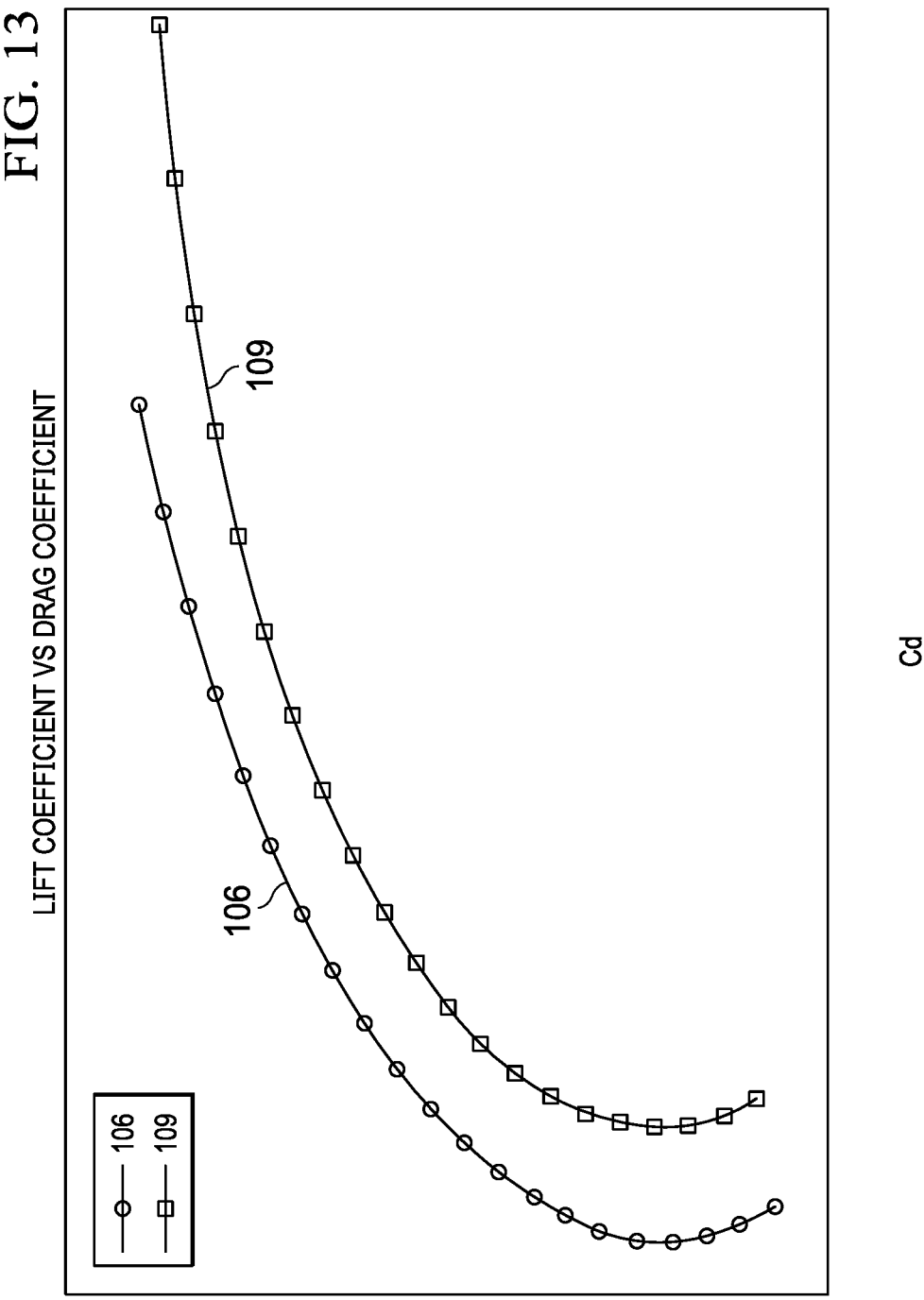
FIG. 13 shows an exemplary graph charting lift coefficient and drag coefficient of a rotor blade 106 and a rotor blade 109, according to an illustrative embodiment.

Referring to FIG. 13, the drag coefficient of the rotor blade 106 is reduced as compared to a rotor blade 109. The X-axis represents the drag coefficient and the Y-axis represents the lift coefficient. The rotor blade 106 including the leading edge extension member 130 demonstrates a reduced drag coefficient and increased aerodynamic efficiency of the rotor blade 106 as compared to a rotor blade 109. Accordingly, the methods described herein and the rotor blade 106 including the leading edge extension member 130 can provide an improved lift to drag ratio as compared to a rotor blade designed without these methods and the leading edge extension member 130.

Figure 14:
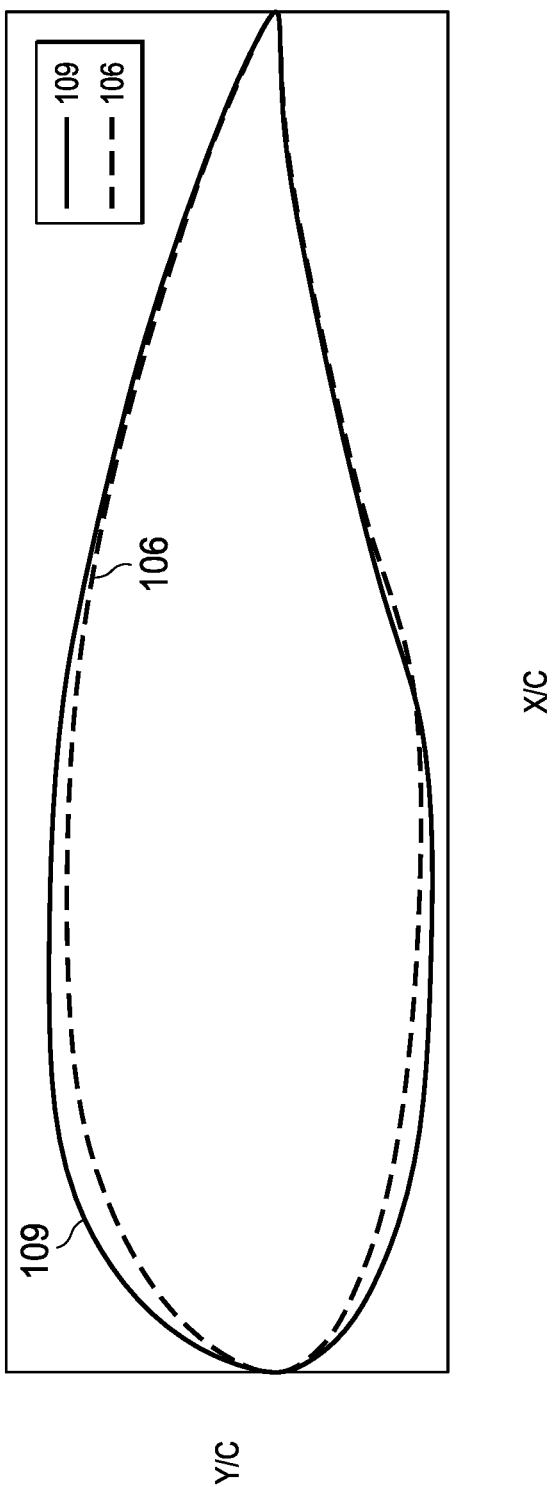
FIG. 14 shows an exemplary graph charting a horizontal axis and chord X/C versus a vertical axis and chord Y/C of a rotor blade 106 and a rotor blade 109; according to an illustrative embodiment.

Referring to FIG. 14, the horizontal axis represents the ratio x/C, where x is the distance to a particular point as measured back from the leading edge, and C is the total chord length from the leading edge to the trailing edge. Thus, the ratio of x/C would be 1.0 at the trailing edge. In a similar fashion, the vertical axes represent the ratio y/C, where y is the distance to a particular point as measured up and down from the chord axis, and C is the total chord length. Thus, the ratio of y/C would be 0.0 at the chord axis. FIG. 14 represents a cross-section of the root portion 140 including the leading edge extension member 130 of the rotor blade 106. FIG. 14 demonstrates that the leading edge extension member 130 results in an improved and reduced aerodynamic profile for the rotor blade 106 as compared to the rotor blade 109 when the thickness t and chord length C are normalized.

The methods described herein can advantageously provide at least one of the following: a delay in chordwise separation of a rotor blade, a reduction of profile drag in the rotor blades, and does not require removal of the leading edge extension member during folding. In an exemplary embodiment, aircraft 10 with plurality of rotor blades 70, 78 having the configuration and profile of rotor blade 106 can have improved performance outcomes as compared to a rotor blade without the leading edge extension member 130 including at least one of the following: reduced fuel burn in cruise; improved hover performance both in and out of ground effect; faster max cruise speed; and increased mission radius of action.

It may be advantageous to set forth definitions of certain words and phrases used in this patent document.

The terms "a" and "an" are defined as one or more unless this disclosure explicitly requires otherwise.

The term "substantially" is defined as largely, but not necessarily wholly, what is specified (and includes what is specified; e.g., substantially 90 degrees includes 90 degrees), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Use of broader terms such as comprises, includes, and has (and any derivatives of such terms, such as comprising, including, and having) should be understood to provide support for narrower terms, such as consisting of, consisting essentially of, and comprised substantially of. Thus, in any of the claims, the term "consisting of," "consisting essentially of," or "comprised substantially of" can be substituted for any of the open-ended linking verbs recited above in order to change the scope of a given claim from what it would otherwise be using the open-ended linking verb.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. The feature or features of one embodiment may be applied to other embodiments to achieve still other embodiments, even though not described, unless expressly prohibited by this disclosure or the nature of the embodiments. The scope of protection is not limited by the description set out above but is defined by the claims that follow, the scope including all equivalents of the subject matter of the claims. Each and every claim is incorporated as further disclosure into the specification and the claims are embodiment(s) of the present invention.

What is claimed is:

1. A method for improving a lift to drag ratio of a rotor blade, comprising:
   providing a blade member having a top side, a bottom side, a leading edge and a trailing edge;
   contacting plies to a mold selectively configured to achieve a desired shape of a pre-cured leading edge extension member;
   curing the pre-cured leading edge extension member with a resin to form a leading edge extension member, the leading edge extension member comprising a top side with an inner surface, a bottom side with an inner surface, and a curved portion disposed between the top side and the bottom side, the leading edge extension member comprised of plies with a cured resin; and
   coupling the inner surfaces of the top side and bottom side of the leading edge extension member to the top side and bottom side, respectively, of the leading edge of the blade member such that the curved portion of the leading edge extension member and the leading edge of the blade member define a hollow interior portion therebetween to form the rotor blade;
   wherein the leading edge extension member is configured to extend a chord length of at least a portion of the rotor blade.

2. The method according to claim 1, wherein the blade member comprises a root portion and a tip portion, the leading edge extension member is disposed on the root portion.

3. The method according to claim 2, wherein the lift to drag ratio of the root portion of the rotor blade is determined by selectively tailoring at least one of a chord length, a thickness, and a shape of the leading edge extension member.

4. The method according to claim 1, wherein the leading edge extension member has a root end, further comprising:
   coupling an end closeout to the root end of the leading edge extension member.

5. The method according to claim 1, further comprising:
   locating the leading edge extension member on the blade member using a groove in the leading edge extension member.

6. A rotor blade comprising:
   a blade member having a top side, a bottom side, a leading edge, and a trailing edge; and
   a leading edge extension member comprising a top side with an inner surface, a bottom side with an inner surface, and a curved portion disposed between the top side and the bottom side; the inner surfaces of the top side and bottom side of the leading edge extension member connected to the top side and the bottom side of the leading edge of the blade member, the leading edge extension member comprised of a plies with a cured resin;
   wherein the leading edge extension member is configured to extend a chord length of at least a portion of the rotor blade;
   wherein the curved portion of the leading edge extension member and the leading edge of the blade member define a hollow interior portion therebetween.

7. The rotor blade according to claim 6, wherein the blade member comprises a root portion and a tip portion, the leading edge extension member is disposed on the root portion of the blade member.

8. The rotor blade according to claim 7, wherein the chord length of the root portion of the blade member is more than the tip portion of the blade member.

9. The rotor blade according to claim 6, wherein the blade member has an airfoil geometry comprising at least one of the following: a NACA geometry and a modified NACA geometry.

10. The rotor blade according to claim 6, wherein the leading edge extension member comprises a convex exterior surface including a ramped portion and an upper portion.

11. The rotor blade according to claim 10, wherein the ramped portion has an inclined angle greater than an inclined angle of the upper portion.

12. The rotor blade according to claim 6, wherein the leading edge extension member further comprises a groove disposed on at least one of the top side and the bottom side, the groove configured for locating the leading edge extension member on the blade member.

13. The rotor blade according to claim 6, further comprising an end closeout disposed on a root end of the leading edge extension member.

* * * * *